(12) United States Patent
Tabler

(10) Patent No.: US 7,562,763 B2
(45) Date of Patent: Jul. 21, 2009

(54) CABLE DRIVE FOR OVERHEAD CONVEYOR

(75) Inventor: Charles P. Tabler, Cincinnati, OH (US)

(73) Assignee: OCS Intellitrak, Inc., Cincinnati, OH (US)

( * ) Notice: Subject to any disclaimer, the term of this patent is extended or adjusted under 35 U.S.C. 154(b) by 170 days.

(21) Appl. No.: 11/881,445

(22) Filed: Jul. 27, 2007

(65) Prior Publication Data

US 2009/0026042 A1    Jan. 29, 2009

(51) Int. Cl.
*B65G 17/00* (2006.01)

(52) U.S. Cl. ................... 198/465.4; 104/166

(58) Field of Classification Search .............. 198/465.4; 166/166
See application file for complete search history.

(56) References Cited

U.S. PATENT DOCUMENTS

| | | | |
|---|---|---|---|
| 423,872 A * | 3/1890 | Judson | 104/166 |
| 4,203,511 A * | 5/1980 | Uhing | 198/458 |
| 4,265,178 A | 5/1981 | Veith | |
| 4,358,999 A * | 11/1982 | Nagahori | 104/166 |
| 4,909,153 A * | 3/1990 | Lacroix et al. | 104/166 |
| 4,909,373 A | 3/1990 | Geerts | |
| 4,936,222 A | 6/1990 | Murai | |
| 4,993,326 A | 2/1991 | Bergemann | |
| 5,785,168 A | 7/1998 | Beall, Jr. | |
| 5,806,655 A | 9/1998 | Tabler | |
| 5,919,023 A | 7/1999 | Owens, Jr. | |
| 6,032,785 A * | 3/2000 | Beall, Jr. | 198/465.4 |
| 6,179,701 B1 | 1/2001 | Tieleman | |
| 6,267,060 B1 | 7/2001 | Owens, Jr. | |
| 6,293,388 B1 | 9/2001 | Felter | |
| 6,457,418 B1 * | 10/2002 | Persson | 104/166 |
| 7,125,330 B2 | 10/2006 | Becksma et al. | |
| 7,178,661 B2 | 2/2007 | Tabler | |

FOREIGN PATENT DOCUMENTS

WO    WO 8804641 A1 *   6/1988

* cited by examiner

*Primary Examiner*—Mark A Deuble
(74) *Attorney, Agent, or Firm*—Chase Law Firm, L.C.

(57) ABSTRACT

In a drive system for an overhead conveyor, a first drive shaft presents a path of travel for a trolley, and a second drive shaft spaced from the first drive shaft provides a continuation of the path of travel. A flexible drive cable spans the gap between the shafts and interconnects the terminal end of the first shaft with the receiving end of the second shaft to transfer torque thereto to rotate the second shaft. The cable comprises spiral wound strands joined together to preclude unraveling thereof and thus the second shaft may be driven by the first shaft when their longitudinal axes are not collinear.

6 Claims, 4 Drawing Sheets

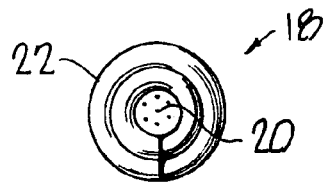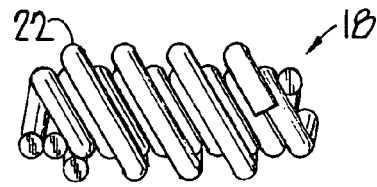
Fig. 3  Fig. 4
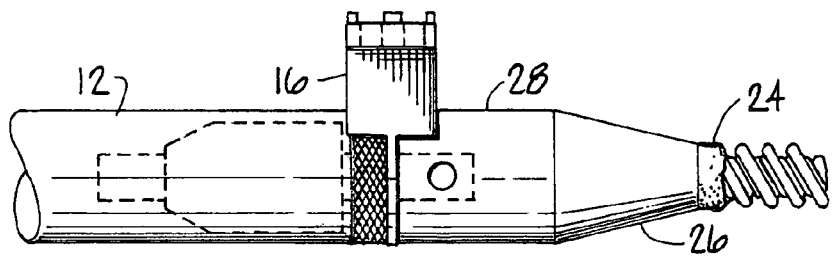
Fig. 5
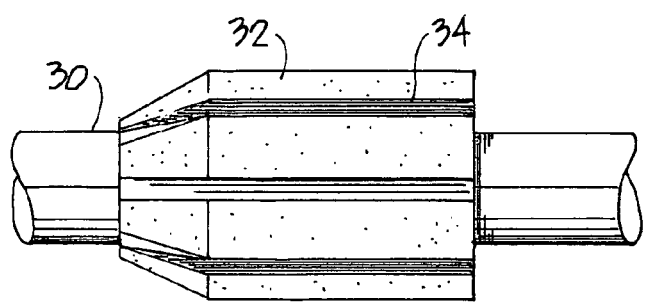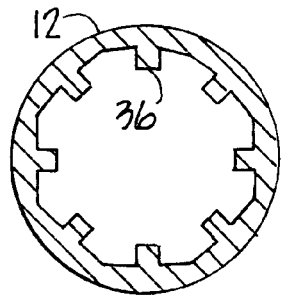
Fig. 6  Fig. 7

CABLE DRIVE FOR OVERHEAD CONVEYOR

This invention relates to a cable drive system for overhead conveyors utilized to transport parts, products or materials in assembly or treatment operations.

BACKGROUND OF THE INVENTION

Overhead conveyors are utilized in various production, assembly and treatment environments to transport parts or products through operational stages. Typically, such conveyors employ a rotating, generally horizontal tube or shaft that supports trolleys from which the load is suspended. Wheels on the trolleys ride on the surface of the rotating drive tube, and each is mounted for rotation about a driven wheel axis that is non-parallel and non-perpendicular to the drive tube axis, preferably at an acute angle to the drive axis. Often, there are various points in the path of the conveyor where a drive tube terminates, and the drive is then picked up by another drive tube spaced therefrom down the conveyor line. Separate drives may be required to rotate the separate tubes. As the trolleys may be spaced apart a distance greater than the space between the ends of the drive tubes, advancement of the trolleys (and thus the load suspended therefrom) is not interrupted by the spaced drives.

A switch is utilized when it is desired to selectively control the path of the trolley. At a switch, one drive ends and one of two drives spaced therefrom receives the advancing trolley depending upon the position of the switch. In this configuration the incoming drive is separately driven, as are each of the two receiving drives, thereby requiring separate drives at a two-position switch junction. Accordingly, three or more separate drives are required at a switch depending upon the number of switch positions.

SUMMARY OF THE INVENTION

In an embodiment of the present invention the aforementioned necessity of separate drives in certain conveyor configurations is addressed by providing a continuous drive for an overhead conveyor that spans a gap between consecutive drive tubes or shafts so that a single drive rotates both shafts, thereby eliminating the requirement of a second drive. A forward end of a first drive shaft is connected by a flexible drive cable to a receiving end of a second, spaced drive shaft thereby transferring torque from the first shaft to the second shaft to provide a continuous drive and eliminate the need for a separate drive for the second shaft. The flexible drive cable thus spans the gap between the forward end of the first drive shaft and the rearward end of the second drive shaft. The drive cable comprises spiral wound steel strands welded together through the core of the cable whereby the cable maintains its integrity as a rotating drive member. The flexibility of the cable allows a first shaft to drive a second shaft when the longitudinal axes thereof are not collinear, and thus eliminates one of the drives otherwise necessary at a switch or a turn.

Other advantages of this invention will become apparent from the following description taken in connection with the accompanying drawings, wherein is set forth by way of illustration and example, an embodiment of the present invention.

BRIEF DESCRIPTION OF THE DRAWINGS

FIG. 3 is an enlarged end view of the cable component of the drive.

FIG. 4 is a side view of a segment of the cable.

FIG. 5 shows the connection of an end of the cable with a drive tube or shaft, the broken lines in FIG. 5 within the drive tube indicating the drive cone at the end of the cable.

FIG. 6 is an enlarged, fragmentary view of the drive cone.

FIG. 7 is an enlarged, cross-sectional view of the drive tube only.

DETAILED DESCRIPTION

Figure 1:
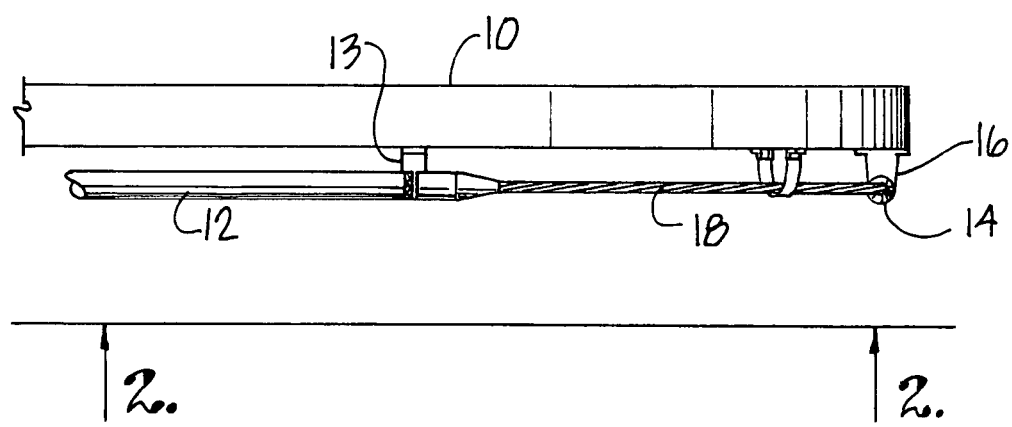
FIG. 1 is an elevational view showing a drive tube or shaft to which a cable of the present invention is connected.
Figure 2:
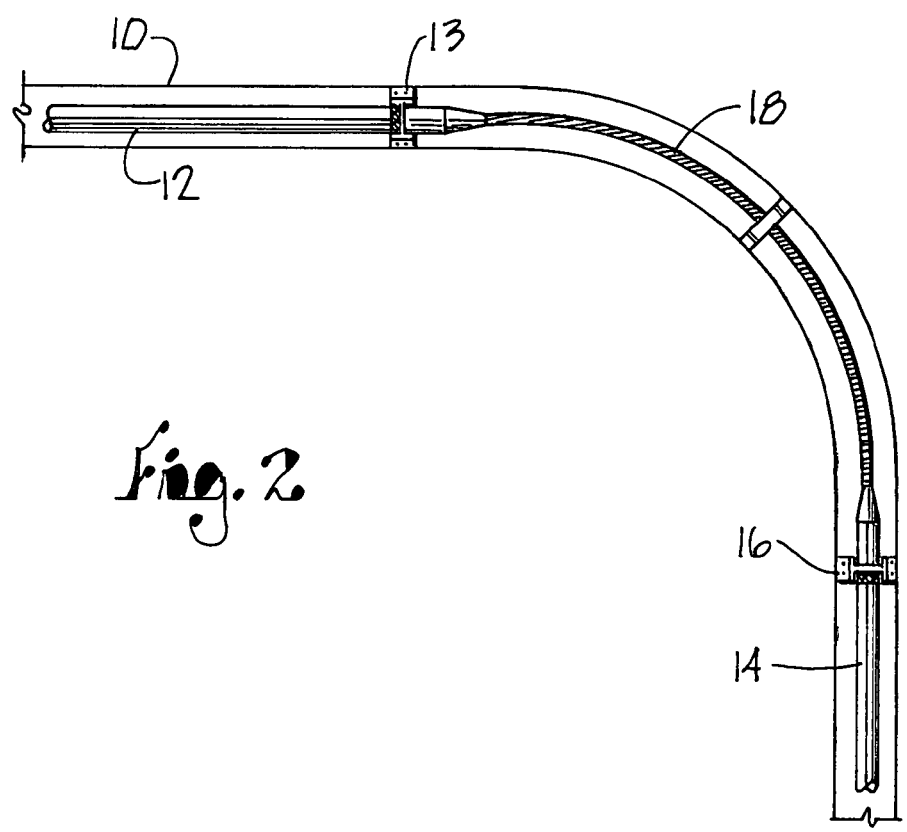
FIG. 2 is a bottom view taken along line 2-2 in FIG. 1 illustrating the ability of the cable drive to transfer torque through a 90-degree turn.

Referring initially to FIGS. 1 and 2, an elongated overhead support 10 presents a 90° curve as viewed from below (FIG. 2) and provides a mount (bracket 13) for a drive tube or shaft 12 extending to the right as seen in the figures, and a second drive tube or shaft 14 suspended beneath the support 10 by bracket 16. The terms "drive tube" and "drive shaft" are used interchangeably for the drive component in the overhead conveyor art, and have the same meaning herein. A cable drive 18 of the present invention connects the end of drive tube 12 seen in FIGS. 1 and 2 to the adjacent end of drive tube 14 and thus either tube 12 or tube 14 may be driven (rotated) and the other tube thereby caused to rotate. FIGS. 1 and 2 illustrate the capability of the cable drive 18 to transfer torque from a drive shaft such as tube 12 to a driven tube 14 without the need to provide a separate drive for tube 14.

FIGS. 3-7 show cable 18 and its interconnection with drive tube 12 in detail. In particular, FIGS. 3 and 4 show that the cable 18 comprises a multiple strand core 20 of steel wires about which a plurality of steel strands 22 are spirally wound. Four such strands 22 are illustrated, each of which having a diameter, for example, of ⅛ inch. At each end of the cable, such as at the end shown in FIG. 5, a weld 24 extends completely through the cable and securely binds the core 20 and strands 22 together at the end of the cable where it is joined to the frustro-conical end 26 of a tubular fitting 28. The multiple strand, helically and symmetrically arranged cable illustrated is of the type used as a control cable in various industrial and marine applications, such as in ships between the helm and the rudder. The added weld 24 is important in the present invention to rigidly bind the core and the strands at each end of the cable so that the cable will maintain its integrity as a rotating drive member and not unravel. An axial stem 30 having a drive cone 32 thereon with spaced longitudinal grooves 34 positively connects the cable 18 to the drive tube 12 as the grooves 34 receive corresponding lands 36 on the inner surface of the drive tube 12 (FIG. 7).

Figure 8:
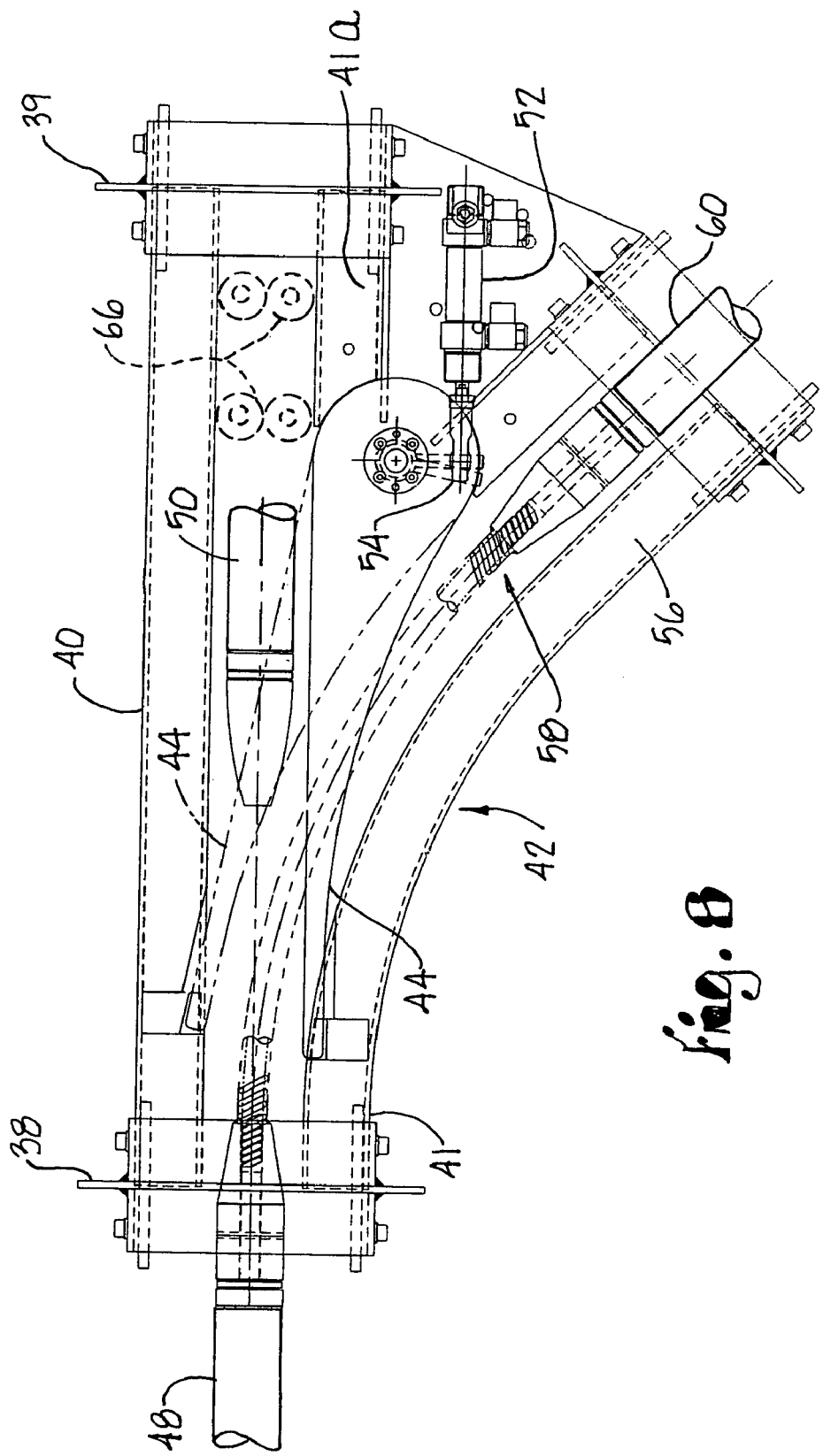
FIG. 8 is a fragmentary plan view of a 45° switch assembly incorporating the cable drive improvement of the present invention.

In FIG. 8 a 45° switch of a type used in overhead conveyors is shown. A portion of the conveyor is illustrated fragmentarily. A pair of spaced hanger assemblies 38 support load rails 40 and 41 in a conventional manner. The load rail 41 is curved through a 45° switch assembly 42 having a pivotal track member 44 which, in the full line position thereof, directs trolleys (not shown in detail) moving from left to right along a path from hanger assembly 38 to hanger assembly 39 along load rail 40 and track member 44 to the right end of the switch where the trolley wheels (trolley guide wheels shown fragmentarily at 66) leave the switch and ride on a continuation 41a of load rail 41 and the adjacent load rail 40. In this configuration two drives are required, one at an entering drive shaft 48 and a second drive at a receiving drive shaft 50.

As is conventional, an air cylinder 52 is provided for shifting track member 44 from the full line position shown to the broken line position thereof upon activation of the air cylinder 52 to rotate crank 54. In the broken line position a trolley is now directed to the curved portion 56 of track 41 which extends downwardly and to the right at a 45° angle with respect to drives 48 and 50. The cable drive 58 of the present invention connects drive 48 with a drive shaft 60 to transfer torque to shaft 60 thereby eliminating the separate drive that would otherwise be required for shaft 60. Accordingly, the present invention provides simplicity and economy in the design of overhead conveyors by eliminating separate drives that would otherwise be required, as illustrated in the example shown in FIG. 8.

Figure 9:
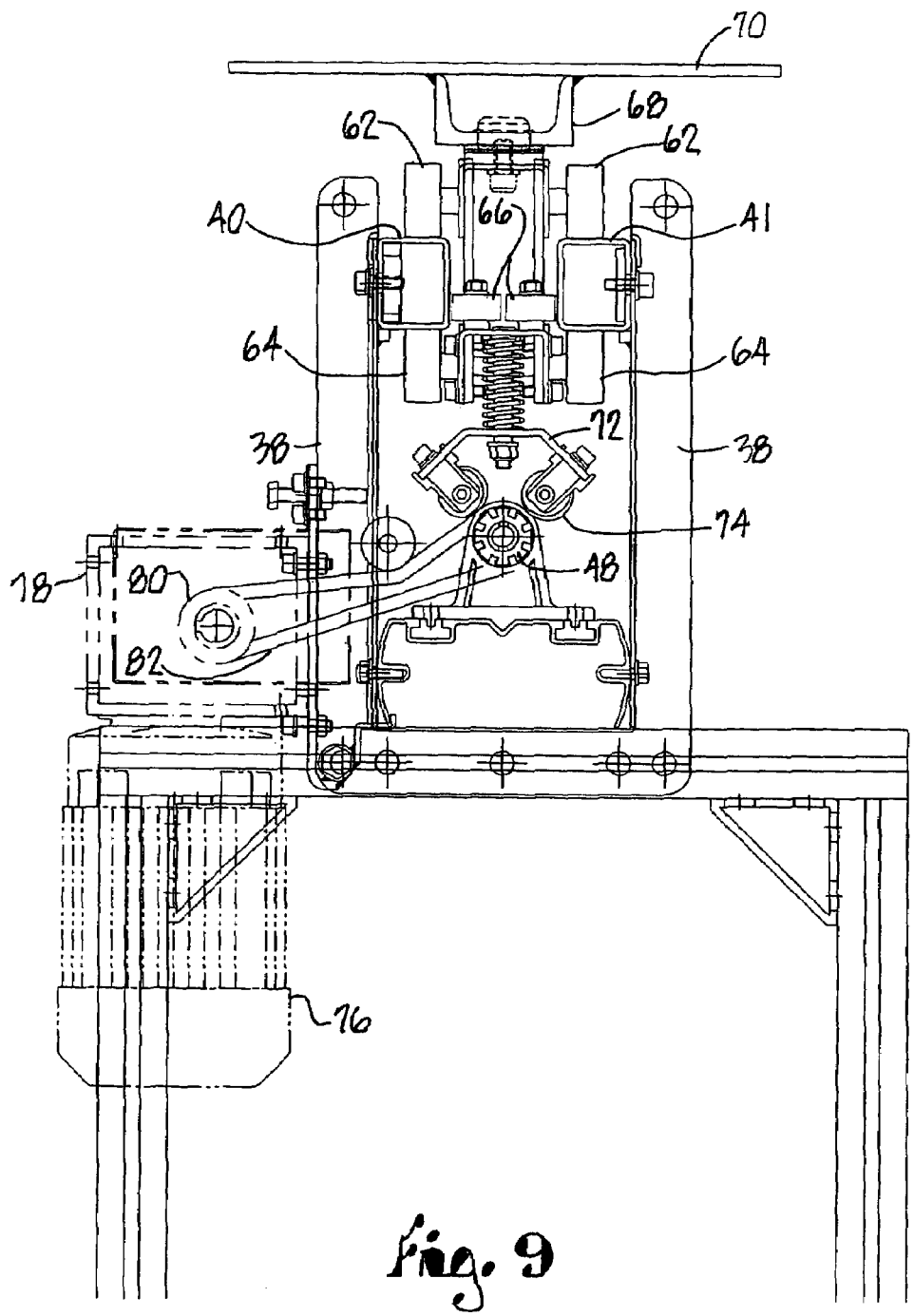
FIG. 9 is a vertical cross-section through an overhead conveyor at a right angle to a drive tube, showing a trolley as viewed in the direction of the transporting path, certain parts of the trolley being removed for clarity.

FIG. 9 illustrates an inverted overhead conveyor on load rails 40 and 41 ahead of the switch assembly 42, basic components of the trolley including two pairs of upper load wheels 62 (one pair being visible) riding on the upper surface of respective rails 40 and 41, corresponding lower load wheels 64 riding on the lower surface of load rails 40 and 41, and two pairs of guide wheels 66 (two wheels being visible) which rotate about vertical axes and contact the respective inner faces of load rails 40, 41. The trolley supports a channel-shaped load bar 68 on which a horizontal product platform 70 or other support is welded. A yoke plate 72 carries four drive wheels 74 (two of which are visible) which contact the surface of a drive shaft such as, for example, drive shaft 48 in FIG. 8. Drive is typically provided by an electric motor 76 coupled via gear box 78 to a drive pulley 80 connected to drive tube 48 via belt 82. Certain additional components are removed for clarity. It should be noted that the guide wheels 66 shown diagrammatically in FIG. 8 are contained between the load rails 40 and 41 in the solid line position of the track member 44 of switch assembly 42 illustrated. In the broken line position of the member 44, the guide wheels 66 follow the path from drive shaft 48 to drive shaft 60, between rail 56 and switch member 44 in its broken line position.

From the foregoing it may appreciated that the flexible drive cable of the present invention eliminates the need for a second, independent drive when a gap is presented between the drive shafts of an overhead conveyor system. Furthermore, it is not required that the longitudinal axes of spaced drive shafts be collinear in order for the drive cable to effectively transfer torque, such as through a turn in the conveyor or a switch as illustrated in FIG. 8.

It is to be understood that while certain forms of an embodiment of this invention have been illustrated and described, it is not limited thereto, except insofar as such limitations are included in the following claims and allowable equivalents thereof.

Having thus described the invention, what is claimed as new and desired to be secured by Letters Patent is:

1. In a drive system for an overhead conveyor:
   a first drive shaft rotatable about a first longitudinal axis and presenting a path of travel for a trolley engaged therewith, and terminating at a forward end thereof,
   a second drive shaft rotatable about a second longitudinal axis and presenting a continuation of said path of travel, and having a rearward end spaced from said forward end thereby presenting a gap between said drive shafts,
   drive structure connected with said first drive shaft for rotating the same about its longitudinal axis, and
   a flexible drive cable spanning said gap and interconnecting said forward end of the first drive shaft with said rearward end of the second drive shaft to transfer torque thereto to rotate the second shaft,
   said cable comprising spiral wound strands joined together to preclude unraveling thereof, whereby the second shaft may be driven by the first shaft when said first and second longitudinal axes are collinear or not collinear.

2. In the drive system as claimed in claim 1, wherein said drive cable has a core of wires about which said strands are wound and secured to said core at said ends of the shafts.

3. In the drive system as claimed in claim 2, wherein said core and strands are metallic and welded together at said forward end of the first drive shaft and said rearward end of the second drive shaft.

4. In the drive system as claimed in claim 1, wherein said strands are metallic and welded together at said forward end of the first drive shaft and said rearward end of the second drive shaft.

5. In a drive system for an overhead conveyor:
   a first drive shaft rotatable about a first longitudinal axis and presenting a path of travel for a trolley engaged therewith, and terminating at an end thereof,
   a second drive shaft rotatable about a second longitudinal axis not collinear with said first axis and presenting a continuation of said path of travel, and having an end thereof spaced from said end of the first drive shaft thereby presenting a gap between said drive shafts,
   drive structure connected with one of said drive shafts for rotating the same about its longitudinal axis, and
   a flexible drive cable spanning said gap and interconnecting said ends of the first and second drive shafts to transfer torque and provide a continuous drive,
   said cable comprising spiral wound strands joined together to preclude unraveling thereof, whereby both of the shafts are driven by the drive structure.

6. In the drive system as claimed in claim 5, further comprising a third independently driven drive shaft longitudinally aligned with said first drive shaft and having an end spaced from said end of the first drive shaft; and a switch having a first position directing movement of a trolley along said first and third drive shafts, and a second position directing movement of a trolley along said first and second drive shafts.

* * * * *